Jan. 11, 1966 W. H. BRASKAMP 3,228,260
TABLE VENTILATOR
Filed Feb. 1, 1963 2 Sheets-Sheet 2
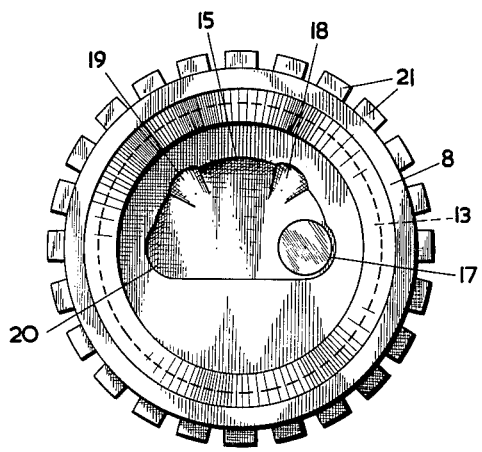
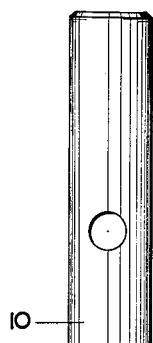
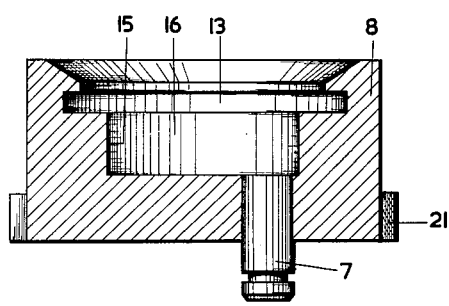

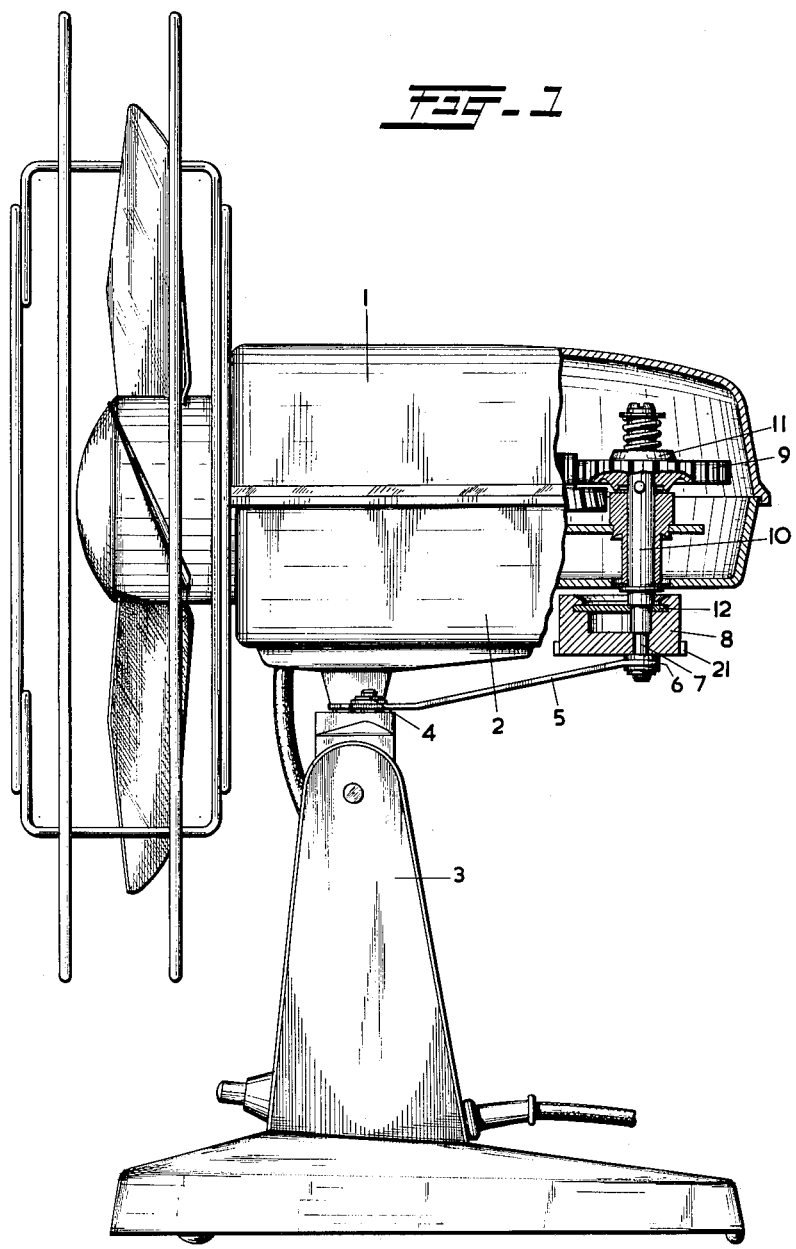

3,228,260
TABLE VENTILATOR
Willem Hendrik Braskamp, Voorburg, Netherlands, assignor to N.V. Industriele Onderneming W. H. Braskamp, Rijswijk, Netherlands, a corporation of the Netherlands
Filed Feb. 1, 1963, Ser. No. 255,609
Claims priority, application Netherlands, Feb. 26, 1962, 275,259
6 Claims. (Cl. 74—600)

The invention relates to a table ventilator whose ventilator casing is adapted to oscillate through the cooperation between an arm fitted pivotally to a stationary part of the ventilator and an adjustable eccentric engaging the other end of the arm and driven by the ventilator motor. Table ventilators of this type are commonly known and an example thereof is shown in U.S. Patent 1,638,027.

It is an object of the invention to furnish a table ventilator with a mechanism for the adjustment of the oscillatory movement between zero and a maximum deflection, which mechanism is of extremely simple construction.

This object is achieved according to the invention by said eccentric consisting of a casing with an eccentric pin on which the arm is fixed, a disc being concentrically and rotatably supported in said casing, which disc is rigidly mounted on a shaft driven by the ventilator motor, said shaft having the same eccentricity in relation to the disc that the pin has in relation to the casing. Disc and casing are rotatable in relation to each other, so that, also owing to the identical eccentricity of the shaft and the pin, a relative position of the disc and the casing is possible in which the pin is in line with the shaft, and the eccentric accordingly takes up the zero position, so that the casing of the ventilator does not oscillate. Through a relative rotation of the casing in relation to the disc the desired eccentric position with the corresponding deflection of the casing of the ventilator is obtained. The maintenance of the eccentric position may be ensured by various expedients. According to the invention a very simple solution is obtained when the disc is supported with friction in the casing. This can be achieved by making the casing of friction material, but also by making the disc of such material. Furthermore the shaft may be made to rest against a semi-circular inner wall of the casing, which thus determines the initial and the final position of the eccentric, and this inner wall may be provided with a number of indentations or notches, in which the shaft comes to rest, which is possible if the disc is accommodated with some clearance in the casing.

The casing is preferably provided with a notched rim, by means of which the adjustment can be brought about.

The invention will now be explained more fully with reference to the drawings, wherein:

FIGURE 1 is a side elevation, partly in vertical section, of the casing of the ventilator.

FIGURE 2 is a top view of the casing of the eccentric.

FIGURE 3 is a cross-section of FIGURE 2.

FIGURE 4 shows the shaft driven by the motor.

The motor casing 1 of the ventilator is supported on the base 3 so as to be rotatable about the vertical shaft 2. Pivotally attached to the base 3 at 4 is an arm 5, which arm is supported at 6 on the trunnion 7 of the casing 8 of the eccentric mechanism.

The motor shaft of the ventilator, not shown in the drawing, drives a gear wheel reduction mechanism 9, which drives the shaft 10 through a safety coupling 11. Rigidly mounted on the shaft 10 is a disc 12, which disc is rotatably supported in an internal groove 13 of the casing 8. The shaft 10 has an extension 14, which rests against the inner wall 15 of a semi-circular recess 16, which wall may be provided with indentations 17, 18, 19, 20.

The disc 12 can be kept in place in the groove 13 exclusively by friction, but this effect may also be replaced or aided, as the case may be, by other expedients, such as the resting of the shaft extension 14 against the wall 15, provided with indentations, of the recess 16.

It will be obvious that when the notched rim 21 of the casing 8 is gripped and rotated in relation to the shaft 10, i.e. in relation to the disc 12, a change of the eccentricity will be brought about.

The apparatus as shown and described consists of only a few components, which can be manufactured by simple means.

What is claimed is:
1. For an oscillating table ventilator: a crank structure comprising a driven shaft having an axis and rotatable about said axis, a flat circular disc eccentrically secured to said shaft and rotatable therewith, a casing having a concentric inner groove, said disc being frictionally secured in said groove concentrically with said casing and a trunnion on said casing having the same eccentricity relative to the axis of the casing as the shaft has relative to the disc.

2. A crank structure for an oscillating table ventilator comprising a shaft having an axis and being adapted for being driven about said axis, a flat circular disc eccentrically secured to said shaft and rotatable therewith, a casing having a central axis and a concentric inner groove, said disc being frictionally secured in said groove concentrically with said casing, and a trunnion on said casing having the same eccentricity relative to the axis of the casing as the shaft has relative to the disc, said casing being provided with a recess having a curved bounding wall of circular outline with a center located on the axis of the casing, said wall being provided with recesses, said shaft being in contact with said wall and accommodated in one of said recesses.

3. A crank structure as claimed in claim 2 wherein said wall of said recess has a radius which is equal to the eccentricity of the shaft relative to the disc, said crank structure being adjustable to control the oscillation of said table ventilator by varying the relative position of the disc within the groove of the casing.

4. A crank structure as claimed in claim 2 wherein said disc is constituted of frictional material.

5. A crank structure as claimed in claim 2 wherein said casing is constituted of frictional material.

6. A crank structure as claimed in claim 2 wherein said curved bounding wall is semi-circular in extent.

References Cited by the Examiner
UNITED STATES PATENTS

| | | | |
|---|---|---|---|
| 1,256,121 | 8/1918 | Finch et al. | 230—256 |
| 1,347,981 | 7/1920 | Winter et al. | 230—256 |
| 2,592,237 | 4/1952 | Bradley | 74—571 |
| 2,838,956 | 6/1958 | Schneider | 74—600 |

BROUGHTON G. DURHAM, *Primary Examiner.*
LAURENCE V. EFNER, *Examiner.*